United States Patent [19]

Yan et al.

[11] Patent Number: 5,752,905
[45] Date of Patent: May 19, 1998

[54] AUTOMATIC TOOL-CHANGING MECHANISM

[75] Inventors: Hong-Sen Yan; Fu-Chen Chen, both of Tainan, Taiwan

[73] Assignee: National Science Council, Taipei, Taiwan

[21] Appl. No.: 674,454

[22] Filed: Jul. 2, 1996

[51] Int. Cl.$^6$ ................................. B23Q 3/157
[52] U.S. Cl. ........................... 483/44; 483/39
[58] Field of Search ..................... 483/38, 39, 40, 483/41, 42, 43, 44, 45, 46, 47; 74/813 R, 820

[56] References Cited

U.S. PATENT DOCUMENTS 5,337,623   8/1994   Huang et al. ................... 74/813 R

FOREIGN PATENT DOCUMENTS

| 0004544 | 1/1987 | Japan | 483/44 |
| 120935 | 5/1987 | Japan | 483/39 |
| 123646 | 5/1988 | Japan | 483/44 |
| 1115539 | 5/1989 | Japan | 483/44 |
| 262936 | 10/1990 | Japan | 483/45 |

*Primary Examiner*—William R. Briggs
*Attorney, Agent, or Firm*—Laff, Whitesel, Conte & Saret, Ltd.

[57] ABSTRACT

The present invention is related to an automatic tool-changing mechanism adapted to be used in a machining center and including a power source, a machine frame and an automatic tool changing device secured to the machine frame, wherein the automatic tool changing device includes a tool changer secured to the machine frame for functioning in tool-grasping, tool-extracting, tool-interchanging, tool-inserting and tool-returning motions; a rotating device secured to a driving shaft and coupled to the tool changer and a swing arm device, the rotating device including a first and second rotating elements in which the first rotating element is used for enabling a to-and-fro swing motion of the swing arm device and the second rotating element is used for enabling a to-and-fro rotary motion of the tool changer to perform the tool-grasping, tool-interchanging and tool-returning motions; and the swing arm device having an intermediate portion thereof pivotally coupled to the machine frame and a first end portion and a second end portion thereof pivotally coupled to the first rotating element and the tool changer, respectively, so as to swing to and fro stably in response to an operation of the first rotating element to facilitate the tool-extracting and tool-inserting motions of the tool changer. The present invention has less mechanical elements compared to the conventional mechanism so that the assembling time can be reduced. In addition, the present invention can effectively lower the rocking of the tool-changing arm upon swinging so as to enhance the positioning precision.

20 Claims, 5 Drawing Sheets

AUTOMATIC TOOL-CHANGING MECHANISM

FIELD OF THE INVENTION

The present invention is related to an automatic tool-changing mechanism, and more particularly to an automatic tool-changing mechanism used in a machining center.

BACKGROUND OF THE INVENTION

In general, an automatic tool-changing mechanism used in a machining center mainly functions in changing the tool in the spindle head with a specific one of the tool magazine in accordance with various machining applications.

Please refer to FIG. 1 which is a schematic front view showing a conventional automatic tool changer. The elements shown in FIG. 1 include a machine frame 1, a face cam 2, a spline shaft 3, a restriction wheel 4, a spline 5, a following roller assembly 6 and a four-bar linkage mechanism constructed by a follower 7 and a first and a second delivery bars 8 and 9. The conventional mechanism is characterized in that the first delivery bar 8 is pivotally mounted to an intermediate portion 91 of the second delivery bar 9 while a first end portion 92 of the second delivery bar 9 is secured to the machine frame 1 and a second end portion 93 of the second delivery bar 9 is secured to the restriction wheel 4.

The working principle of the mechanism shown in FIG. 1 will be further illustrated as follows. The spline shaft 3 secured to a tool-changing arm (not shown) and pivotally coupled to the machine frame 1 drives the four-bar linkage mechanism 7, 8 and 9 to swing back and forth through the face cam 2 to transmit power to the restriction wheel 4 so that upward and downward expanding and contracting motions axially relative to the machine frame 1 and the spline 5 are performed to extract and/or insert a tool. Meanwhile, the spline 5 connected to the spline shaft 3 and the machine frame 1 moves in a direction opposite to the motion of the spline shaft 3, while the following roller assembly 6 secured to the spline 5 and a roller gear cam (not show) enables the leftward and rightward to-and-fro rotary motions of the spline 5 and the spline shaft 3 through the rotation of the roller gear cam to have the tool-grasping, tool-interchanging and tool-returning motions performed.

An advantage of the conventional mechanism is that the motion of the follower 7 of the face cam 2 can be amplified through the four-bar linkage mechanism 7, 8 and 9 so that the face cam 2 can be designed to be a small one and can be designed and machined together with the roller gear cam. However, the large number of the bars in the four-bar linkage mechanism 7, 8 and 9 as well as the complicated structure of the mechanism results in the difficulty in assembling, wherein the structure of the four-bar linkage mechanism 7, 8 and 9 is formed by connecting the first delivery bar 8 to the intermediate portion 91 of the second delivery bar 9, securing the first end portion 92 to the machine frame 1 and securing the second end portion 93 to the restriction wheel 4. Furthermore, owing to the unavoidable errors occurring while manufacturing and assembling, the clearance between the joints of the first and the second delivery bars 8 and 9 and the clearance between the face cam 2 and the follower 7 will be amplified through the first and the second delivery bars 8 and 9 so as to result in the rocking of the tool-changing arm upon the to-and-fro motions. Thus, the positioning precision will be reduced and the vibration and the noise will be derived. In addition, the joints of the bars and the rollers will be worn out soon. Of course, the further result will be the enlargement of the clearance and accordingly the weakening of the accelerator.

SUMMARY OF THE INVENTION

An object of the present invention is to provide an automatic tool-changing mechanism used in a machining center, which has a small number of bars and a simple structure and are easily manufactured and assembled.

Another object of the present invention is to provide an automatic tool-changing mechanism used in a machining center, which is capable of reducing the rocking of the mechanism upon changing a tool so as to enhance the positioning precision and reliability.

In accordance with the present invention, the present invention is related to an automatic tool-changing mechanism adapted to be used in a machining center and comprising a power source, a machine frame and an automatic tool changer secured to the machine frame, wherein the automatic tool changing device includes a tool changer secured to the machine frame for functioning in tool-grasping, tool-extracting, tool-interchanging, tool-inserting and tool-returning motions; a rotating device secured to a driving shaft and coupled to the tool changer and a swing arm device, the rotating device including a first and second rotating elements in which the first rotating element is used for enabling a to-and-fro swing motion of the swing arm device and the second rotating element is used for enabling a to-and-fro rotary motion of the tool changer to perform the tool-grasping, tool-interchanging and tool-returning motions; and the swing arm device having an intermediate portion thereof pivotally coupled to the machine frame and a first end portion and a second end portion thereof pivotally coupled to the first rotating element and the tool changer, respectively, so as to swing to and fro stably in response to an operation of the first rotating element to facilitate the tool-extracting and tool-inserting motions of the tool changer.

The tool changer preferably includes a tool-changing arm; a spline shaft secured to the tool-changing arm and pivotally coupled to the machine frame; a restriction wheel mounted around the spline shaft and coupled to the second end portion of the swing arm device, the first rotating element enabling the to-and-fro rotary motion of the swing arm device to transmit work to the restriction wheel so that the spline shaft performs an expanding and contracting motion in an axial direction relative to the machine frame and a spline, thereby having the tool-extracting and tool-inserting motions performed; the spline pivotally coupled to the spline shaft and the machine frame and performing an expanding and contracting motion in a direction opposite to the motion of the spline shaft; and a following roller assembly secured to the spline and coupled to the second rotating element to enable a to-and-fro rotary motion of the spline shaft and the spline in response to a rotation of the second rotating element to facilitate the performance of the tool-grasping, tool-interchanging and tool-returning motions. In this case, the first and second rotating elements are preferably integral and co-axial composite cams which are secured to the driving shaft with a cam key and exhibit a specific time-sequence relationship.

Especially, the first rotating element can be a face cam, and the face cam can include a follower which is pivotally coupled to the machine frame and connected to the swing arm device. Preferably, the face cam is arranged thereon a closed-curved track for driving the follower and the swing arm device to swing back and forth in response to a rotation thereof.

In a preferred embodiment, one end of the follower has a roller thereat for being secured to the face cam, and another end of the follower can be arranged with a fork slot for allowing a roller in the swing arm device to roll in the slot, thereby amplifying a swing amplitude of the follower driven by the face cam and transmitting the amplified swing to the swing arm device. Alternatively, another end of the follower can be mounted with a roller which rolls in a fork slot mounted in the swing arm device, thereby amplifying a swing amplitude of the follower driven by the face cam and transmitting the amplified swing to the swing arm device.

In accordance with a preferred embodiment of the present invention, the second rotating element can be a roller gear.

Preferably, there are a plurality of open-curved tracks arranged on a peripheral surface of the roller gear cam for connecting and conjugatedly engaging the roller gear cam with the following roller assembly, thereby enabling the to-and-fro rotary motion of the spline and the spline shaft to have the tool-grasping, tool-interchanging and tool-returning motions performed.

In accordance with another aspect of the present invention, the swing arm device is a swing arm. A roller is preferably located at the first end portion of the swing arm and the roller is used for rolling in a fork slot mounted in the first rotating element. Alternatively, a fork slot can be located at the first end portion of the swing arm and the fork slot is provided for a roller mounted in the first rotating element to roll therein. Furthermore, another roller is preferably located at the second end portion of the swing arm and connecting to the restriction wheel, and the first rotating element enables the to-and-fro swing motion of the swing arm to transmit work to the restriction wheel so that the spline shaft performs an expanding and contracting motion in an axial direction relative to the machine frame and a spline, thereby having the tool-extracting and tool-inserting motions performed.

In accordance with another aspect of the present invention, the power source includes a motor, a first belt wheel mounted to the motor and a belt.

Preferably, the belt is sleevingly coupled to the belt wheel and the driving shaft so that the driving shaft can drive the rotating device to rotate in response to a power inputted from the motor.

The tool changer preferably further includes a decelerator mounted between the power source and the driving shaft for reducing the power inputted from the motor and changing its direction to facilitate the driving shaft to drive the rotating device to rotate. The decelerator can include a worm shaft having a second belt wheel which is sleevingly coupled with the belt together with the first belt wheel so that the power inputted from the motor can be transferred to drive the worm shaft to rotate; and a worm gear co-axial to the rotating device and secured to the driving shaft with a worm-gear key, the worm gear being connected to the worm shaft to have the driving shaft rotate in response to a rotation of the worm shaft.

Of course, the decelerator can be a bevel gear assembly.

The foregoing objectives, features and functions of the present invention will be more readily understood upon a thoughtful deliberation of the following detailed description of two embodiments of the present invention in conjunction with the accompanying drawings.

Figure 1:
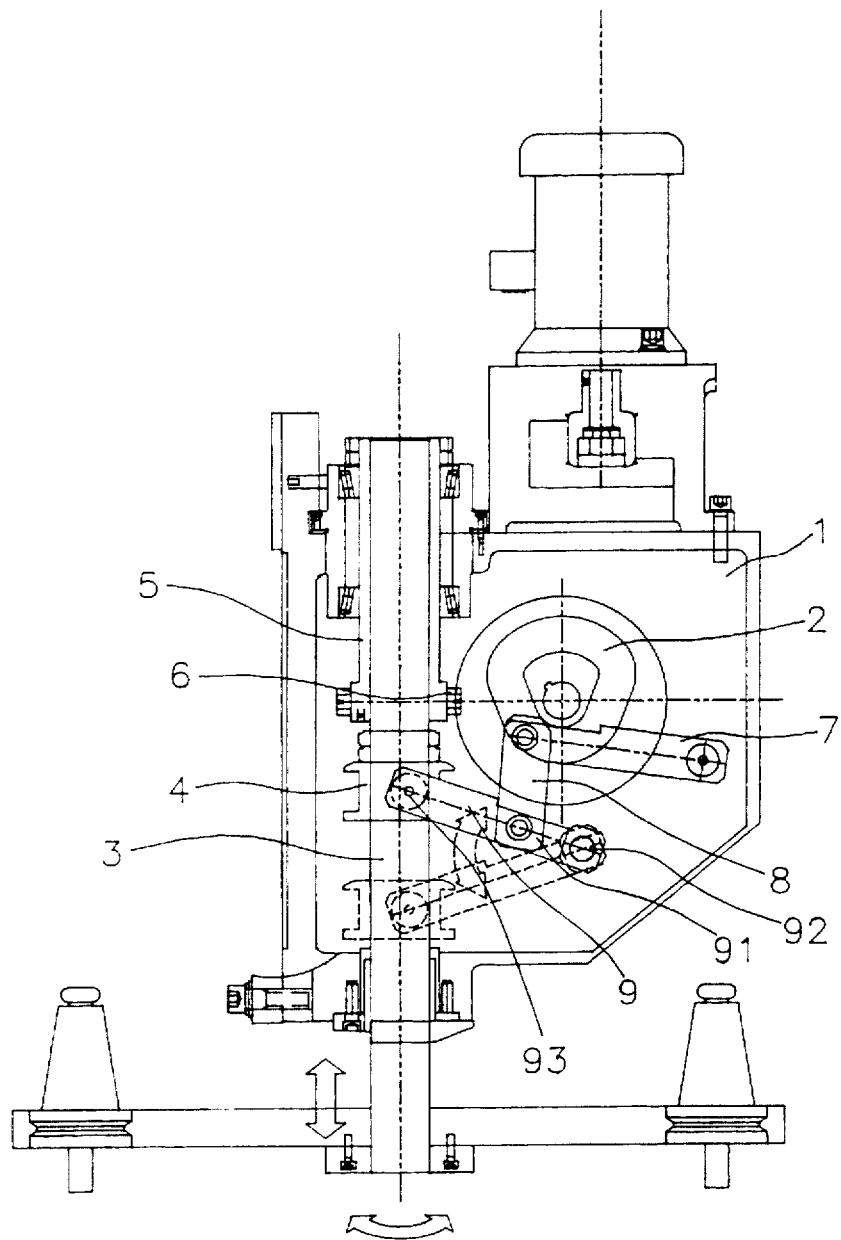
FIG. 1 is a front view showing a conventional automatic tool changer.
Figure 2:
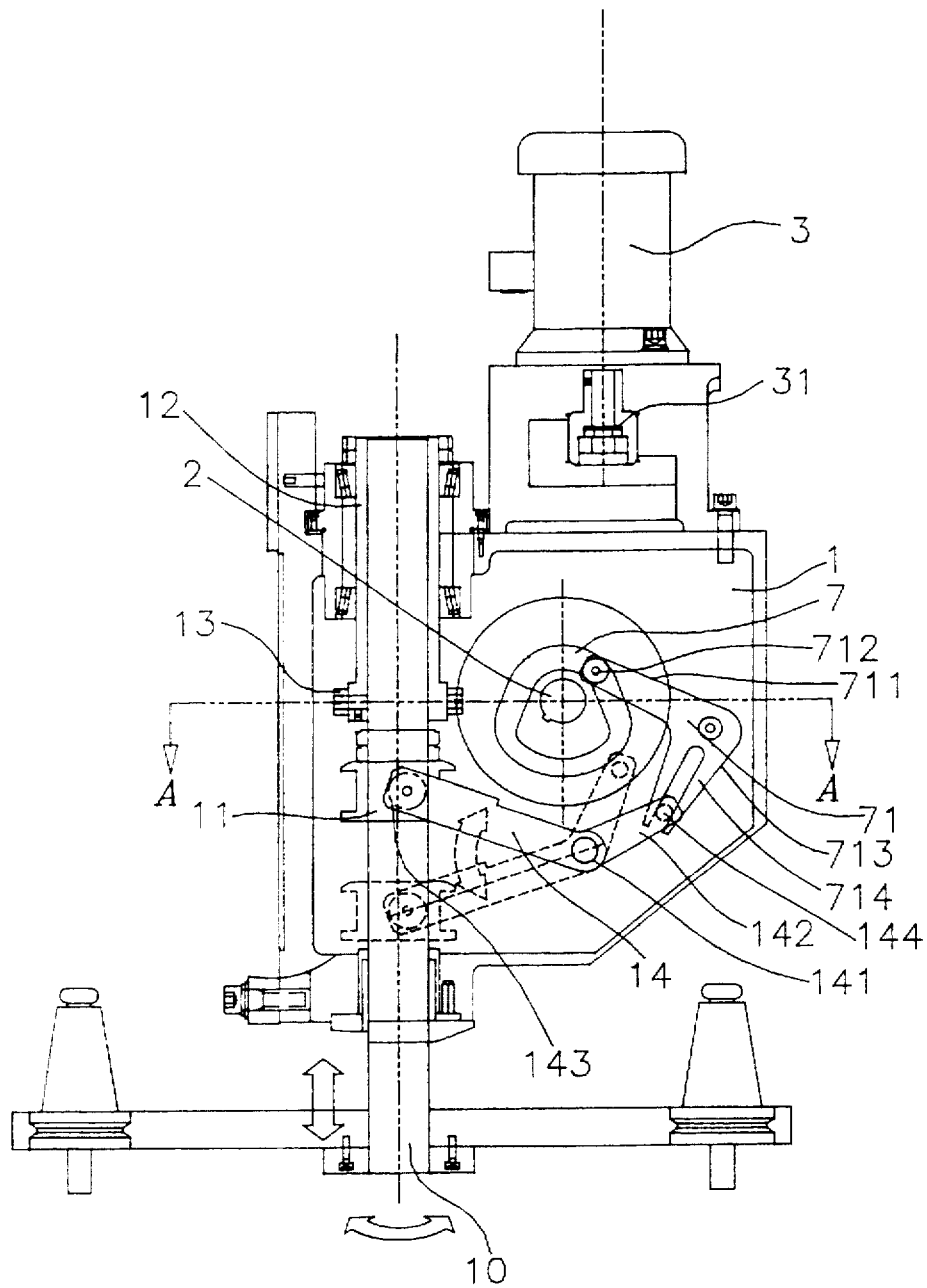
FIG. 2 is a front view showing a preferred embodiment of an automatic tool-changing mechanism according to the present invention.
Figure 3:
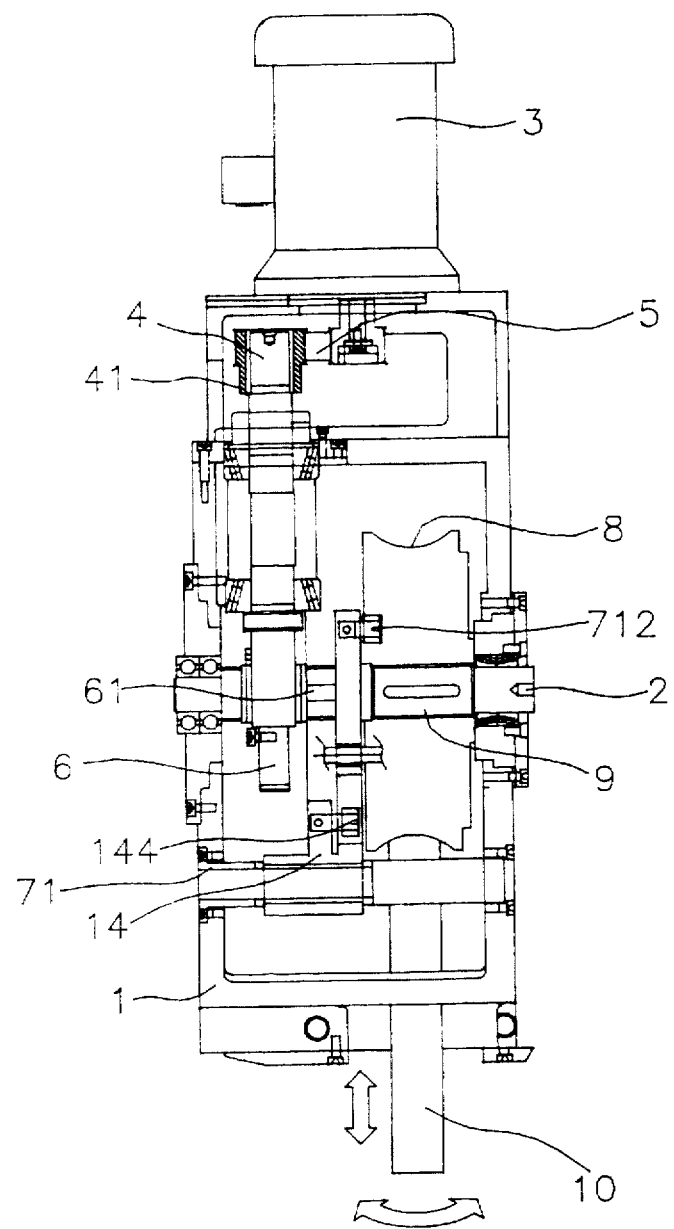
FIG. 3 is a right-side view showing the preferred embodiment of FIG. 2.
Figure 4:
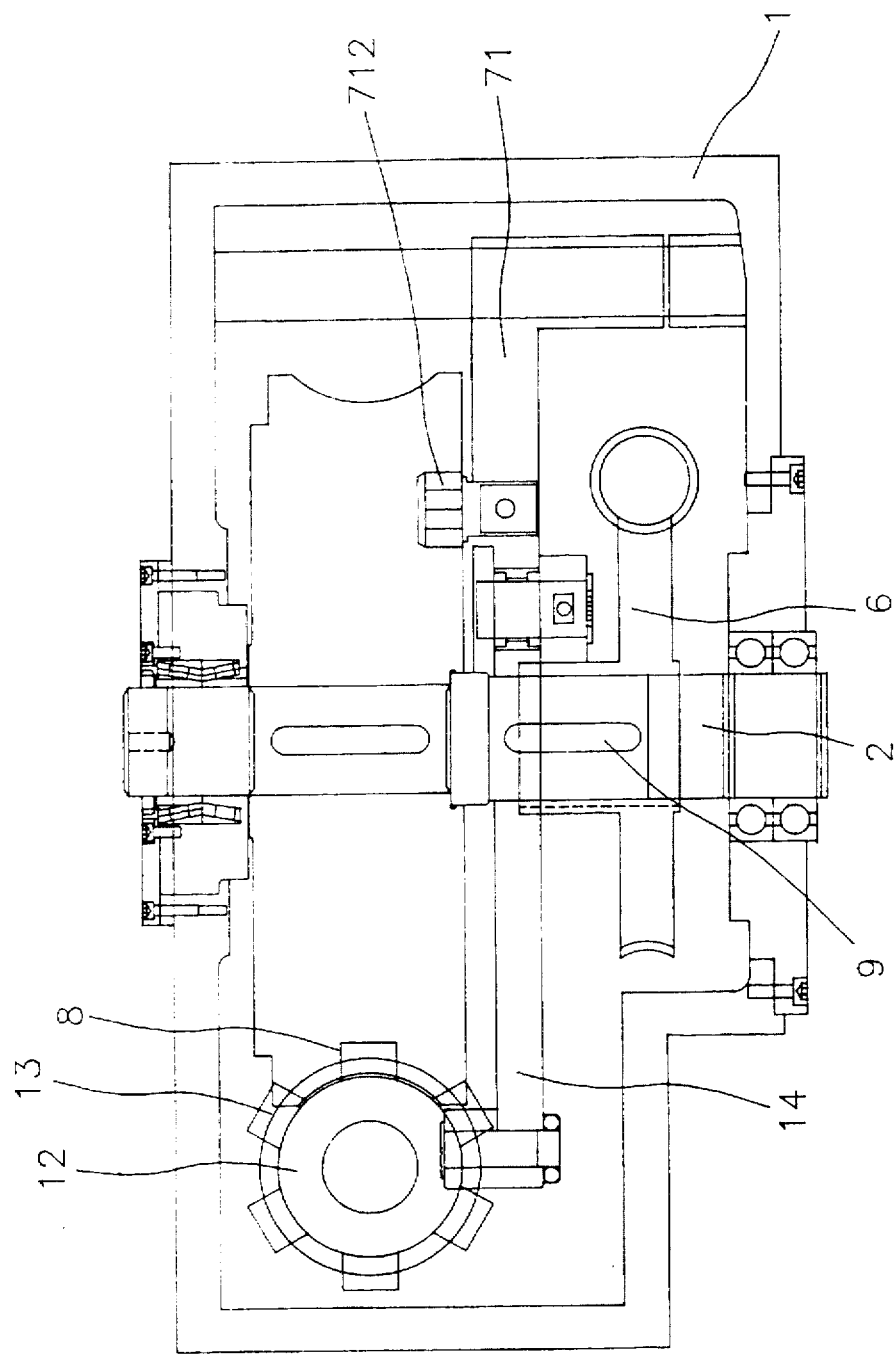
FIG. 4 is a cross-sectional view taken along the line A—A of FIG. 2.

Please refer to FIGS. 2 and 3 which are a front and a right-side 1 views showing a preferred embodiment of an automatic tool-changing mechanism according to the present invention with reference to FIG. 4 which is a cross-sectional view taken along the line A—A of FIG. 2. The elements shown in these figures include a machine frame 1, a driving shaft 2, a motor 3, a worm shaft 4, a first and a second belt wheels 31 and 41, a belt 5, a worm gear 6, a worm-gear key 61, a face cam 7, a roller gear cam 8, a cam key 9, a spline shaft 10, a restriction wheel 11, a spline 12, a following roller assembly 13 and a swing arm 14, wherein the swing arm 14 includes an intermediate portion 141, a first end portion 142 and a second end portion 143.

The face cam 7 includes a follower 71 coupled to the swing arm 14, and in addition, the face cam 7 is arranged thereon a closed-curved track for driving the follower 71 and the swing arm 14 device to swing back and forth in response to a rotation thereof. There are a plurality of open-curved tracks arranged on the peripheral surface of the roller gear cam 8 for connecting and conjugatedly engaging the roller gear cam 8 with the following roller assembly 13. Moreover, the face cam 7 and the roller gear cam 8 are integral and co-axial composite cams which are secured to the driving shaft 2 with the cam key 9 and exhibit a specific time-sequence relationship (referring to FIG. 5).

The follower 71 is pivotally coupled to the machine frame 1 and connected to the swing arm 14, wherein one end 711 of the follower 71 has a roller 712 thereat for being secured to the face cam 7 and the other end 713 of the follower 71 is arranged with a fork slot 714 for allowing a roller 144 mounted at the first end portion 142 of the swing arm 14 to roll in the slot 714. Alternatively, the other end 713 of the follower 71 can be mounted with the roller 144 which rolls in the fork slot 714 mounted in the first end portion 142 of the swing arm 14.

The present invention is characterized in that the intermediate portion 141 of the swing arm 14 is pivotally connected to the machine frame 1, and the first end and the second end portions 142 and 143 are pivotally connected to the follower 71 and the restriction wheel 11, respectively, so that the present invention uses less mechanical bar elements compared to the conventional mechanism. Furthermore, the novel link manner among the intermediate portion 141, the first end portion 142 and the second end portion 143 is capable of reducing the rocking of the swing arm 14 upon swinging to facilitate the smooth tool-changing operations of the tool-changing arm (not shown).

A further illustration on the working principle of the preferred embodiment according to the present invention will be given below with reference to FIGS. 2 and 4 again in order to further clarify the inventive spirit of the present invention.

A decelerator including the worm shaft 4, the second belt wheel 41 mounted to the worm shaft 4, the worm gear 6 and the worm-gear key 61 or a bevel gear assembly (not shown) is mounted between a power source composed of the motor 3, the first belt wheel 31 and the belt 5 and the driving shaft 2. The decelerator is used for reducing the power inputted from the motor 3 and changing its direction to facilitate the driving shaft 2 to drive the face cam 7 and the roller gear cam 8 to rotate. In other words, the belt 5 is sleevling coupled to the first and the second belt wheels 31 and 41 so that the motor 3 can transmit power to the worm shaft 4 through the belt 5 to enable the rotation of the worm shaft 4 to rotate the worm gear 6. The worm gear 6 is co-axial to the composite cams consisted of the face cam 7 and the roller gear cam 8, and the worm gear 6 is secured to the driving shaft 2 of the composite cams through the worm-gear key.

On the other hand, the face cam 7 and the roller gear cam 8 are secured to the driving shaft 2 through the cam key 9. The face cam 7 enables the stable to-and-fro swing motion of the swing arm 14 connected to the follower 71 through the follower 71. Thereafter, since the restriction wheel 11 is secured to the outer periphery of the spline shaft 10 and connected to the second end portion 143 of the swing arm 14, the face cam 7 enables the to-and-fro swing motion of the swing arm 14 to transmit work to the restriction wheel 11 so that the spline shaft 10 performs an expanding and contracting motion in an axial direction relative to the machine frame 1 and the spline 12, thereby having the tool-extracting and tool-inserting motions performed.

Further, by way of the rotation of the roller gear cam 8, the following roller assembly 13 connected to the roller gear cam 8 enables the leftward and rightward to-and-fro rotary motions of the spline 12 and the spline shaft 10 to have the tool-grasping, tool-interchanging and tool-returning motions performed.

Figure 5:
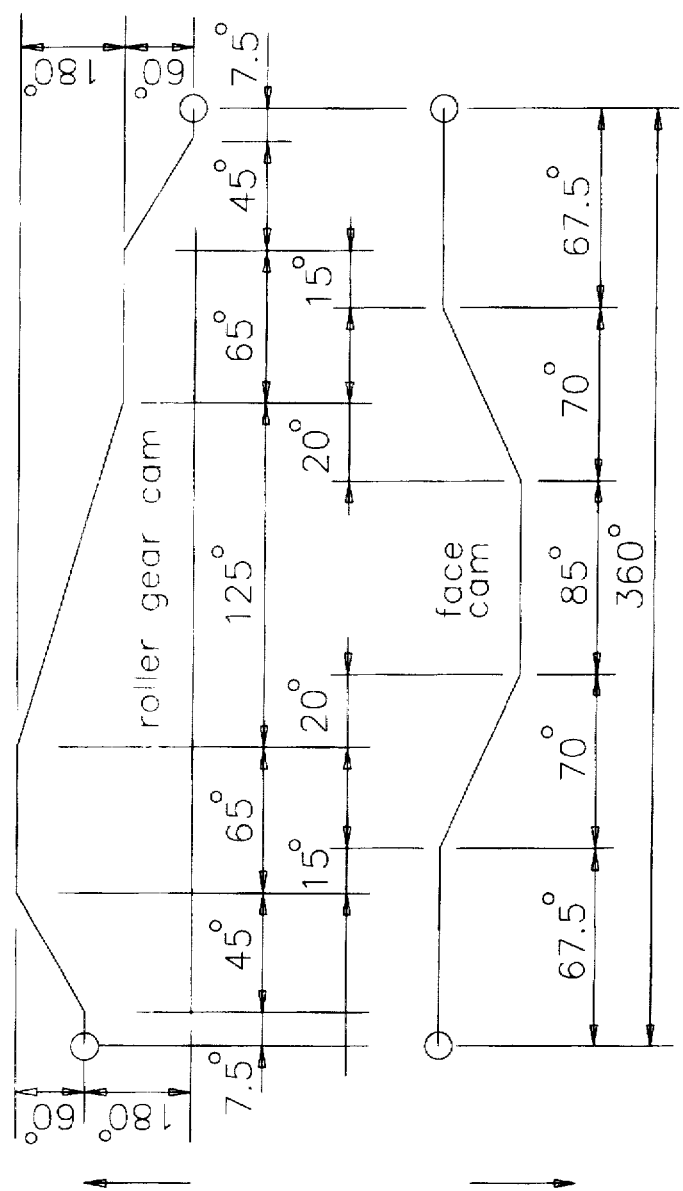
FIG. 5 shows time-sequences of the face cam and the roller gear cam according to the present invention.

As for the operational time sequences of the face cam and the roller gear cam in a preferred embodiment according to the present invention, it can be best understood with reference to FIG. 5.

To sum up, the present invention has less mechanical elements compared to the conventional mechanism so that the assembling time can be reduced. Also, the clearance problems generated upon manufacturing and assembling can be lessened owing to the reduction of the mechanical elements. In other words, the present invention can effectively lower the rocking of the tool-changing arm upon swinging so as to enhance the positioning precision. Another advantage of the present invention is that the tool-changing and the swinging/rotating elements can be operated more smoothly compared to the conventional mechanism to have the tool-grasping, tool-extracting, tool-interchanging, tool-inserting and tool-returning motions performed.

While the invention has been described in terms of what are presently considered to be the most practical and preferred embodiments, it is to be understood that the invention need not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An automatic tool-changing mechanism adapted to be used in a machining center and comprising a power source, a machine frame, and an automatic tool changing device secured to said machine frame, said automatic tool changing device including:

a tool changer secured to said machine frame for functioning in tool-grasping, tool-extracting, tool-interchanging, tool-inserting and tool-returning motions;

a rotating device secured to a driving shaft and coupled to said tool changer and a swing arm device, said rotating device including a first rotating element for enabling a to-and-fro swing motion of said swing arm device and a second rotating element for enabling a to-and-fro rotary motion of said tool changer to perform said tool-grasping, tool-interchanging and tool-returning motions; and said swing arm device having an intermediate portion thereof pivotally coupled to said machine frame and a first end portion and a second end portion thereof pivotally coupled to said first rotating element and to said tool changer, respectively, so as to swing to and fro stably in response to an operation of said first rotating element to facilitate said tool-extracting and tool-inserting motions of said tool changer.

2. An automatic tool-changing mechanism according to claim 1 wherein said tool changer includes:

a tool-changing arm;

a spline shaft secured to said tool-changing arm and pivotally coupled to said machine frame;

a restriction wheel mounted around said spline shaft and coupled to said second end portion of said swing arm device, said first rotating element enabling said to-and-fro swing motion of said swing arm device to transmit work to said restriction wheel so that said spline shaft performs an expanding and contracting motion in an axial direction relative to said machine frame and a spline, thereby having said tool-extracting and tool-inserting motions performed;

said spline pivotally coupled to said spline shaft and said machine frame and performing an expanding and contracting motion in a direction opposite to said motion of said spline shaft; and a following roller assembly secured to said spline and coupled to said second rotating element to enable a to-and-fro rotary motion of said spline shaft and said spline in response to a rotation of said second rotating element to facilitate the performance of said tool-grasping, tool-interchanging and tool-returning motions.

3. An automatic tool-changing mechanism according to claim 2 wherein said first and second rotating elements are integral and co-axial composite cams which are secured to said driving shaft with a cam key and exhibit a specific time-sequence relationship.

4. An automatic tool-changing mechanism according to claim 3 wherein said first rotating element is a face cam.

5. An automatic tool-changing mechanism according to claim 4 wherein said face cam includes a follower which is pivotally coupled to said machine frame and connected to said swing arm device.

6. An automatic tool-changing mechanism according to claim 5 wherein said face cam is arranged thereon a closed-curved track for driving said follower and said swing arm device to swing back and forth in response to a rotation thereof.

7. An automatic tool-changing mechanism according to claim 5 wherein one end of said follower has a roller thereat for being secured to said face cam.

8. An automatic tool-changing mechanism according to claim 7 wherein another end of said follower is arranged with a fork slot for allowing another roller in said swing arm device to roll in said fork slot, thereby amplifying a swing amplitude of said follower driven by said face cam and transmitting said amplified swing to said swing arm device.

9. An automatic tool-changing mechanism according to claim 7 wherein another end of said follower is mounted with another roller which rolls in a fork slot mounted in said swing arm device, thereby amplifying a swing amplitude of said follower driven by said face cam and transmitting said amplified swing to said swing arm device.

10. An automatic tool-changing mechanism according to claim 3 wherein said second rotating element is a roller gear cam.

11. An automatic tool-changing mechanism according to claim 10 wherein there are a plurality of open-curved tracks arranged on a peripheral surface of said roller gear cam for connecting and conjugatedly engaging said roller gear cam with said following roller assembly, thereby enabling said to-and-fro rotary motion of said spline and said spline shaft to have the tool-grasping, tool-interchanging and tool-returning motions performed.

12. An automatic tool-changing mechanism according to claim 2 wherein said swing arm device is a swing arm.

13. An automatic tool-changing mechanism according to claim 12 wherein a roller is located at said first end portion of said swing arm and said roller is used for rolling in a fork slot mounted in said first rotating element.

14. An automatic tool-changing mechanism according to claim 12 wherein a fork slot is located at said first end portion of said swing arm and said fork slot is provided for a roller mounted in said first rotating element to roll therein.

15. An automatic tool-changing mechanism according to claim 12 wherein another roller is located at said second end portion of said swing arm and connecting to said restriction wheel, and said first rotating element enables said to-and-fro swing motion of said swing arm to transmit work to said restriction wheel so that said spline shaft performs an expanding and contracting motion in an axial direction relative to said machine frame and a spline, thereby having said tool-extracting and tool-inserting motions performed.

16. An automatic tool-changing mechanism according to claim 1 wherein said power source includes a motor, a first belt wheel mounted to said motor, and a belt.

17. An automatic tool-changing mechanism according to claim 16 wherein said belt is sleevingly coupled to said belt wheel and said driving shaft so that said driving shaft can drive said rotating device to rotate in response to a power inputted from said motor.

18. An automatic tool-changing mechanism according to claim 16 wherein said tool changer further includes a decelerator mounted between said power source and said driving shaft for reducing said power inputted from said motor and changing its direction to facilitate said driving shaft to drive said rotating device to rotate.

19. An automatic tool-changing mechanism according to claim 18 wherein said decelerator includes:

a worm shaft having a second belt wheel which is sleevingly coupled with said belt together with said first belt wheel so that said power inputted from said motor can be transferred to drive said worm shaft to rotate; and a worm gear co-axial to said rotating device and secured to said driving shaft with a worm-gear key, said worm gear being pivotally connected to said worm shaft to have said driving shaft rotate in response to a rotation of said worm shaft.

20. An automatic tool-changing mechanism according to claim 18 wherein said decelerator is a bevel gear assembly.

* * * * *